UNITED STATES PATENT OFFICE 2,153,059

CHROMABLE DYESTUFFS OF THE TRIARYL-METHANE SERIES AND PROCESS OF PREPARING THEM

Wilhelm Eckert and Karl Schilling, Frankfort-on-the-Main-Hochst, Germany, assignors to General Aniline Works, Inc., New York, N. Y., a corporation of Delaware No Drawing. Application February 23, 1937, Serial No. 127,312. In Germany February 26, 1936

9 Claims. (Cl. 260—336)

The present invention relates to chromable dyestuffs of the triarylmethane series and to a process of preparing them.

We have found that very clear dyestuffs of the triarylmethane series capable of being chromed are obtainable by condensing one molecular proportion of the anhydride of 5-hydroxybenzene-1.2.4-tricarboxylic acid or of 3-hydroxybenzene-1.2.4-tricarboxylic acid (5- or 3-hydroxytrimellitic acid) or the equivalent amount of the free acid with 2 molecular proportions of an N-substituted m-amino-phenol, the condensation being suitably carried out so that the hydroxy-trimellitic anhydride concerned is used in excess.

The same or similar dyestuffs are obtainable by condensing 1 molecular proportion of an N-substituted m-aminophenol or 1 molecular proportion of resorcylic acid with the substituted benzol-benzoic acid which is obtainable by condensation of one molecular proportion of hydroxy-trimellitic acid with only one molecular proportion of the N-substituted m-aminophenol and is probably formed as intermediate product in the condensation referred to in the preceding sentence. When an N-substituted m-aminophenol is used, the formation of the dyestuff probably occurs, for instance, as follows:

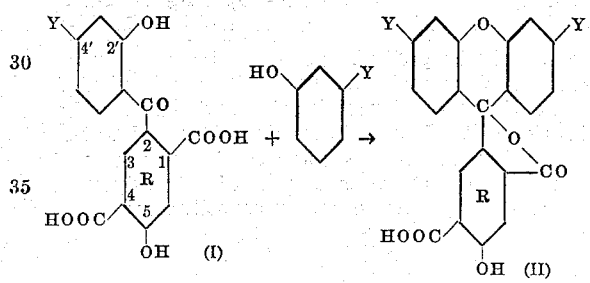

wherein Y represents a substituted amino group.

The dyestuffs obtainable according to the process of the present invention are new. For instance, there are obtained dyestuffs which probably corresponds with the general formula:

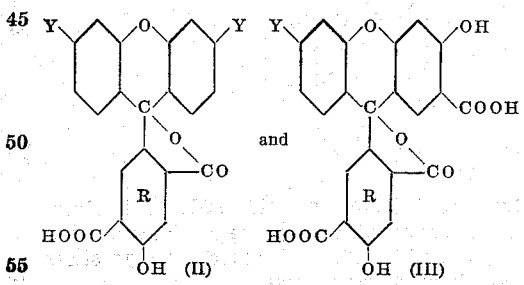

wherein Y represents a substituted amino-group.

The same dyestuffs may also be characterized by a quinoide constitution as follows:

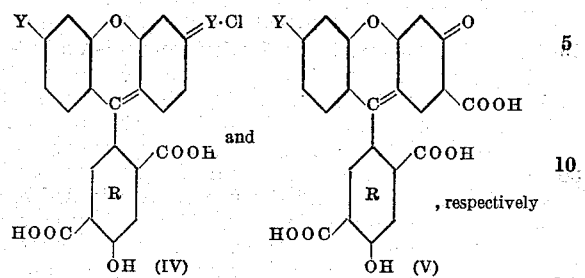

wherein Y represents a substituted amino-group.

It is not known with certainty whether the hydroxyl and carboxyl groups, standing in ortho positions to each other in the nuclei R of the formulae I to V, occupy the positions indicated in these formulae. The hydroxy-trimellitic acid may react in another manner than supposed with the N-substituted m-aminophenol and there may be formed isomeric compounds of the general constitutions:

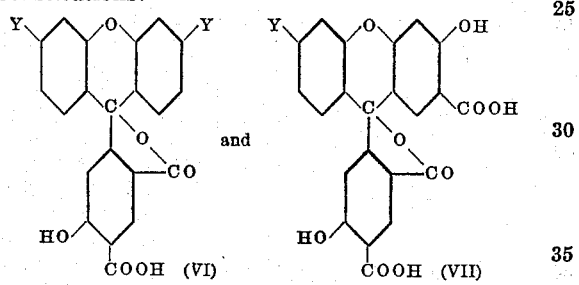

wherein Y represents a substituted amino-group, or the corresponding quinoide constitutions.

The dyestuffs dye, for instance, animal fibers very clear red shades; by after-chroming the fastness properties of the dyeings toward, for instance, water, washing, perspiration, sea water, fulling, carbonizing and light, are essentially enhanced. The dyestuffs may also be after-chromed in substance.

The following examples serve to illustrate the invention, but they are not intended to limit it thereto; the parts are by weight:

(1) 18 parts of meta-diethylamino-phenol and 40 parts of 5-hydroxy-trimellitic anhydride are triturated together and heated, while stirring, at 180° C. in an oil bath until the melt solidifies.

The cooled and finely pulverized mass is dissolved at room temperature in the necessary quantity of a saturated bicarbonate solution and the solution obtained is filtered. To the filtrate there is cautiously added, while stirring, dilute hydrochloric acid until the reaction of the solution has become feebly acid to litmus paper and the mother-liquor above the separated red precipitate appears nearly colorless. The red precipitate is filtered with suction, washed with water and dried.

The new dyestuff dyes, for instance, wool in an acid bath very vivid red tints; by after-chroming the tints are not essentially influenced, but the properties of fastness, especially the fastness to light, to washing and to fulling are considerably enhanced.

The dyestuff may also be used with good success for chrome printing on cotton.

It may also be transformed according to known methods in substance into the corresponding chromium compound.

(2) By using instead of the meta-diethyl-amino-phenol indicated in Example 1 the equivalent amount of meta-dimethylaminophenol, a dyestuff of similar properties is obtained.

(3) 300 parts of 5-hydroxy-trimellitic anhydride and 150 parts of 3-ethylamino-4-methyl-phenol are triturated together and heated for 4 hours at 180° C. After cooling, the melt is pulverized and boiled with dilute hydrochloric acid. The residue is dissolved, while gently heating, in bicarbonate solution or in dilute ammonia, the solution is filtered and the filtrate is acidified by means of hydrochloric acid. The red precipitate which separates is washed with cold water until neutral and dried. For further purification, the dyestuff may be dissolved in dilute ammonia and salted out in the form of its ammonium salt by means of strong ammonium chloride solution. The dyestuff dyes wool from an acid bath red tints. The fastness properties of the dyeings are essentially enhanced by after-chroming.

(4) 185 parts of 3-hydroxy-diphenylamine and 210 parts of 5-hydroxytrimellitic anhydride are triturated together, and the mixture is melted and then stirred, in the course of half-an-hour, at about 150° C. with 130 parts of zinc chloride. The temperature is raised to 180° C. and maintained for 5 hours. After cooling, the solid matter is pulverized, boiled with dilute hydrochloric acid and the residue is filtered with suction, while hot. The reddish-blue residue is at first a soft mass, but on triturating it again with cold water it becomes quickly pulverulent. In order to purify the product furthermore, it is dissolved in hot bicarbonate- or sodium carbonate-solution in which it dissolves with a bluish-red solution, then it is filtered, and the dyestuff is precipitated by acidification in the form of reddish-blue flakes.

The dyestuff sulfonated with fuming sulfuric acid containing 10% of sulfuric anhydride dyes the animal fiber from an acid bath bluish red tints; the fastness properties of the dyeings are essentially enhanced by after-chroming.

(5) 37 parts of (4'-diethylamino-2'-hydroxy)-1-benzoyl-hydroxy-carboxy-2-benzoic acid (obtainable by melting in the course of several hours at 120° C. to 130° C. meta-diethylamino-phenol with 5-hydroxy-trimellitic anhydride; it is a colorless substance, which melts at 160° C. to 170° C. while assuming an intense violet-red color) and 16 parts of anhydrous beta-resorcylic acid are stirred into 40 parts of concentrated sulfuric acid and the whole is heated at 70° C. to 75° C. for about 7 hours. The reaction mixture is poured into 400 parts of ice-water, the separated red precipitate which has separated is filtered with suction and recrystallized from very dilute hot hydrochloric or sulfuric acid.

The dyestuff dyes wool from an acid bath red tints; the dyeings become, on after-chroming, more bluish-red and have essentially enhanced fastness properties.

(6) 38 parts of (4'-diethylamino-2'-hydroxy)-1-benzoyl-hydroxy-carboxy-2-benzoic acid (cp. Example 5) are dissolved in 200 parts of sulfuric acid of 75 to 80 per cent. strength. The solution is heated to 90° C. and 14 parts of pyrogallol are added which dissolve. After heating at 100° C. for 4 to 5 hours the condensation is finished. The whole is poured into about 500 parts of water, the precipitated Bordeaux-red dyestuff is filtered with suction and recrystallized from about 5000 parts of very diluted hydrochloric acid. The dyestuff has the following constitution:

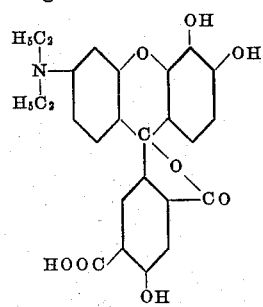

and dyes wool from an acid bath Bordeaux-red tints which, on after-chroming, become violet and possess very good fastness properties.

(7) 76 parts of (4'-diethylamino-2'-hydroxy)-1-benzoyl-hydroxy-carboxy-2-benzoic acid (cp. Example 5) and 45 parts of 2.3-dimethyl-3'-hydroxy-diphenylamine (obtainable by condensation of ortho-xylidine) with (resorcinol by means of boric acid at 180° C.) are dissolved in 250 parts by volume of sulfuric acid of 60° Bé. and the solution is heated at 100° C. to 110° C. for 5 to 6 hours. Thereupon, the whole is poured into about 2000 parts of water, the red precipitate is filtered with suction and washed several times with water. In order to purify the product furthermore it is treated, while gently heating, with 1000 parts of hydrochloric acid of about 25% strength whereby the dyestuff dissolves. If necessary, the product is filtered through a glass suction filter and the dyestuff is precipitated from the clear hydrochloric acid solution by dilution with 3 or 4 times its volume of water. The red precipitate is washed with water until neutral to Congo paper and dried. The dyestuff corresponds to the following constitution:

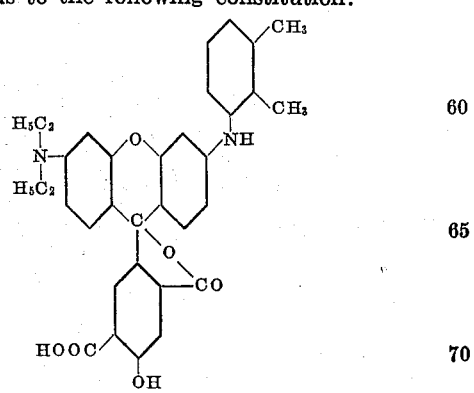

and dyes wool from an acid bath pink tints. When after-chromed, the dyeing assumes a more bluish shade. The after-chromed dyeings show very good fastness properties.

(8) 167 parts of (4'-diethylamino-2'-hydroxy) - 1 - benzoyl - hydroxy - carboxy-2-benzoic acid (cp. Example 5) and 76 parts of 3-ethylamino-para-cresol are heated in 800 parts of concentrated sulfuric for 5 hours at 100° C. to 110° C. The whole is poured into about 5000 parts of water, the red precipitate is filtered with suction and washed with water and then dissolved in dilute ammonia; the solution is filtered and the dyestuff is reprecipitated by means of dilute hydrochloric acid. For subsequent purification, it may be recrystallized from aqueous alcohol or from very dilute hydrochloric acid. The dyestuff possesses the following constitution:

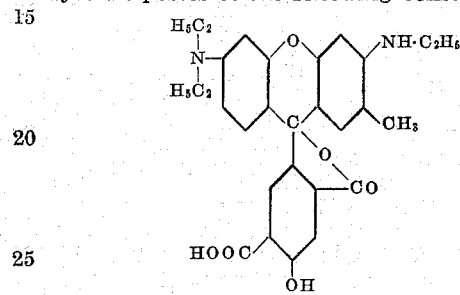

and dyes wool from an acid bath bright pink-red shades. The chromed dyeings show, in general, very good properties of fastness, particularly a very good fastness to light.

(9) By using in the process described in Examples 5, 6, 7 and 8 instead of the (4'-diethylamino-2'-hydroxy)-1- benzoyl-hydroxy-carboxy-2-benzoic acid the corresponding dimethyl compound:

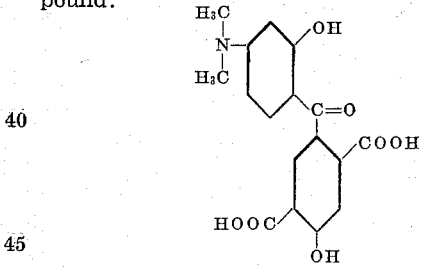

there are obtained dyestuffs of similar properties.

(10) 35 parts of meta-piperidyl-phenol (obtainable from resorcinol and piperidine at 150° C.) are melted and heated at 170° C. to 180° C. for three hours together with 84 parts of 5-hydroxy-trimellitic anhydride, while stirring. The cooled and pulverized melt is stirred with 500 parts of concentrated hydrochloric acid until the dyestuff has dissolved, the solution is filtered with suction to remove the hydroxy-trimellitic acid in excess and some by-products and the dyestuff is precipitated from the hydrochloric acid solution by means of 4 to 5 times its volume of water. The dyestuff corresponding with the formula:

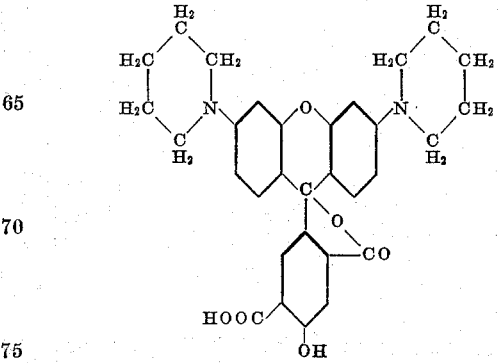

dyes wool from an acid bath bright bluish-red tints, which on after-chroming darken a little and show thereupon very good properties of fastness. The dyestuff is very similar to that described in Example 1.

(11) 70 parts of meta-ethylamino-phenol are melted together with 220 parts of 5-hydroxy-trimellitic anhydride for 5 hours, while stirring, at 170° C. to 180° C. with exclusion of air. The pulverized dyestuff melt is treated as described in Example 10 with 500 parts of concentrated hydrochloric acid and from the hydrochloric acid dyestuff solution the dyestuff is precipitated by means of 4 to 5 times its volume of water. It has the following constitution:

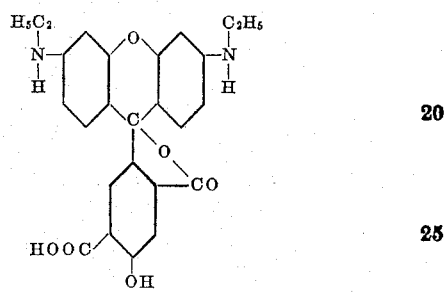

The precipitate is filtered with suction and washed with water until neutral to Congo paper and dried. It dyes wool from an acid bath orange-red tints which, on after-chroming, show good properties of fastness.

(12) 100 parts of 5-hydroxy-trimellitic anhydride and 75 parts the sodium salt of meta-diethylamino-phenol-omega.omega'-disulfonic acid (or the equivalent amount of the free disulfonic acid) are melted together at 200° C. to 210° C. for 2 to 3 hours.

The pulverized melt is stirred into 500 parts of water and the whole is allowed to stand at about 10° C. for a long time (about 12 hours). Hereby the dyestuff dissolves, whereas a great part of the hydroxy-trimellitic acid used in excess precipitates in the form of crystals. The whole is filtered with suction and the red filtrate is stirred with 20 parts of calcium hydroxide in order to eliminate entirely the hydroxytrimellitic acid which still remains in solution.

The hydroxytrimellitic acid forms an insoluble calcium salt and goes into the precipitate which is removed by filtering with suction. The filtrate thus purified is rendered feebly acid to Congo paper by means of sulfuric acid, concentrated to about 100 parts by volume, filtered from the separated calcium sulfate and equal volume of saturated sodium chloride solution is added, while hot. On cooling, the dyestuff precipitates in the form of large flakes and may easily be filtered with suction. The dyestuff having the following constitution:

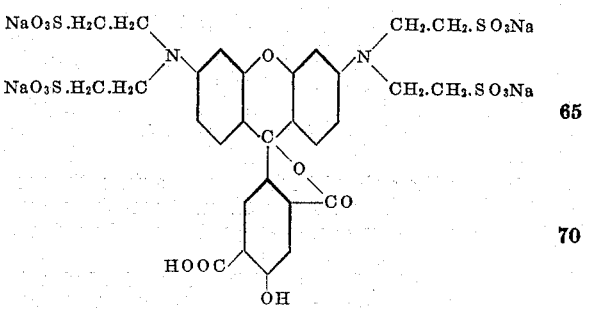

dyes wool from an acid bath clear bluish-red tints which, on after-chroming, become still more bluish and are essentially enhanced in their fastness properties.

(13) 140 parts of the sodium salt of 3-(ethyl-sulfo-ethyl-amino)-4-methyl-phenol of the formula:

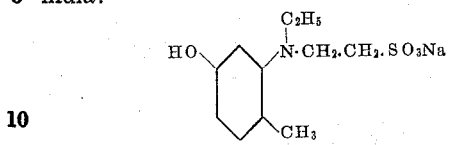

and 210 parts of 5-hydroxy-trimellitic anhydride are melted together at 200° C. to 210° C. for 2 hours. The pulverized melt is stirred into 1000 parts of water and 200 parts of calcium hydroxide are added thereto. After stirring for half-an-hour, the precipitate is filtered with suction and washed with warm water. The filtrate is rendered feebly acid to Congo paper by means of sulfuric acid, concentrated to about 100 parts by volume and filtered from the separated calcium sulfate and to the filtrate is added twice its volume of saturated sodium chloride solution. On cooling, the dyestuff precipitates in the form of red flakes which can easily be filtered with suction. The dyestuff corresponds to the formula:

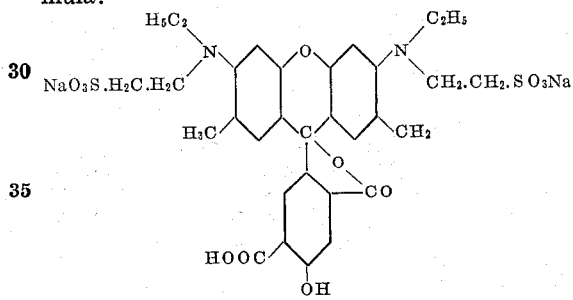

It dyes wool from an acid bath clear red shades which, on after-chroming, become a little more bluish and show very good properties of fastness.

(14) 4.2 parts of 3-hydroxytrimellitic anhydride:

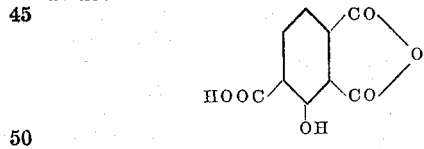

(obtainable by brominating of pseudocumene-5-sulfonic acid in concentrated sulfuric acid, splitting off the sulfo-group, oxidizing and exchanging the bromine atom for the hydroxyl-group) are melted with 2.2 parts of meta-diethylaminophenol, while stirring, at 180° C. to 190° C. for about 3 hours. When the reaction is finished, the whole is allowed to cool. The pulverized melt is stirred, while cold, with concentrated hydrochloric acid whereby the dyestuff dissolves. The solution is filtered with suction from the residue of unchanged 3-hydroxytrimellitic acid and the dyestuff is precipitated from the hydrochloric acid filtrate by means of water. The dyestuff is filtered with suction, dissolved in bicarbonate solution or sodium carbonate solution and the solution is evaporated to dryness.

It dyes the animal fiber from an acid bath very clear bluish red tints which, on after-chroming, become still rather more bluish and then show very good properties of fastness.

(15) By using instead of the meta-diethylaminophenol of Example 14 the meta-dimethylaminophenol and proceeding as described in that example, a dyestuff is obtained which possesses properties similar to those of the dyestuff described in Example 14.

(16) 123 parts of meta-methylamino-phenol are melted together with 400 parts of 5-hydroxy-trimellitic anhydride at 180 C. for 4 hours. After cooling, the pulverized melt is digested with about 5000 parts of hydrochloric acid of 20 per cent. strength at ordinary temperature, whereby the dyestuff dissolves. The hydroxy-trimellitic acid in excess and other by-products remain undissolved and are removed by filtering. By dilution of the filtrate with three to four times its quantity of water, the dyestuff precipitates in the form of red flakes. It may be recrystallized from dilute alcohol. The dyestuff dyes the animal fiber from an acid bath orange-red tints which, on after-chroming, become very fast.

(17) 150 parts of (4'-diethylamino-2'-hydroxy)-1-benzoyl-hydroxy-carboxy-2-benzoic acid (cp. Example 5) are triturated with 250 parts of the sodium salt of diethylamino-meta-phenol-omega.omega'-disulfonic acid and the whole is stirred into 2500 parts of concentrated sulfuric acid. The whole is heated to 90° C. to 100° C., while stirring, until the formation of the dyestuff is at an end. The dyestuff is precipitated by pouring the solution on ice, separated by filtering with suction of the separated dyestuff, dissolving the dyestuff in as small a quantity of hot water as possible and salting out by means of sodium chloride. The dyestuff which dyes wool from an acid bath very clear red shades has the following constitution:

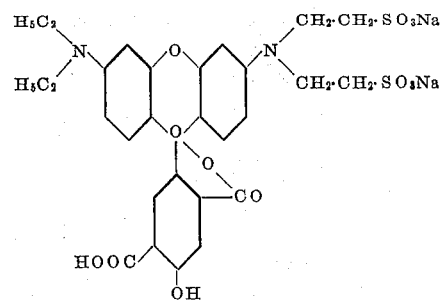

By after-chroming the properties of fastness are essentially enhanced.

(18) 65 parts of 5-hydroxytrimellitic anhydride are heated at 180° C. to 190° C. together with 32 parts of the sodium salt of meta-methyl-ethylamino-phenol-omega-sulfonic acid for 4 hours. The pulverized melt is treated with 200 parts of alcohol for a short time in the warm in order to eliminate the hydroxytrimellitic acid in excess and after cooling, the undissolved matter is filtered with suction. The solid residue is dissolved in about 100 parts of water, the solution is filtered and the dyestuff is salted out by means of sodium chloride. The red dyestuff possesses the following constitution:

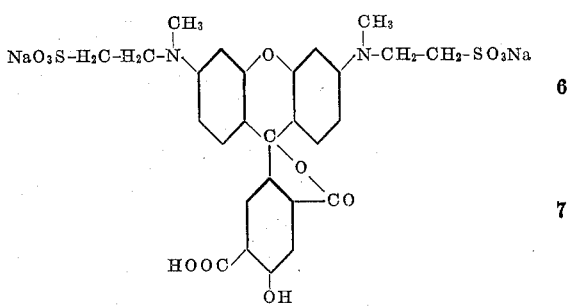

and dyes wool from an acid bath very clear bluish red tints which, on after-chroming, are enhanced in their properties of fastness.

(19) By condensing the 5-hydroxytrimellitic anhydride as described in the foregoing examples with dihydroxyethylamino-phenol for 4 hours at 180° C. to 190° C. and working up the melt in the manner described in Example 10, a dyestuff is obtained which dyes wool likewise very clear bluish red tints which are essentially enhanced in their properties of fastness by after-chroming.

We claim:

1. The compounds of the general formula:

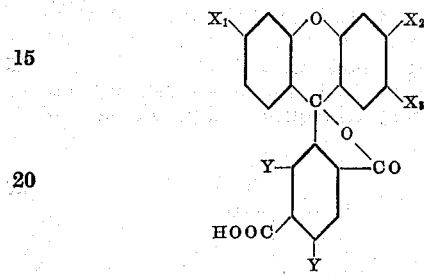

wherein $X_1$ represents a radical of the group consisting of

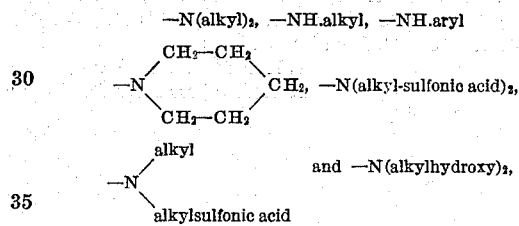

$X_2$ represents a radical of the group consisting of

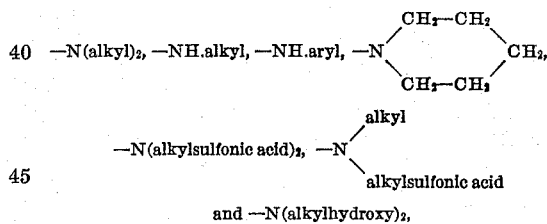

$X_3$ represents a radical of the group consisting of hydrogen and alkyl and wherein one Y represents hydroxy and the other Y hydrogen.

2. The compounds of the general formula:

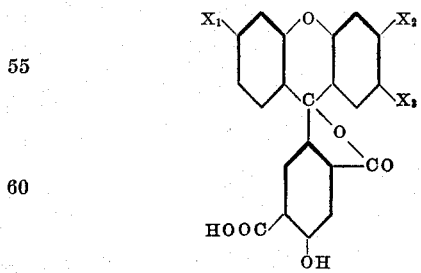

wherein $X_1$ represents a radical of the group consisting of

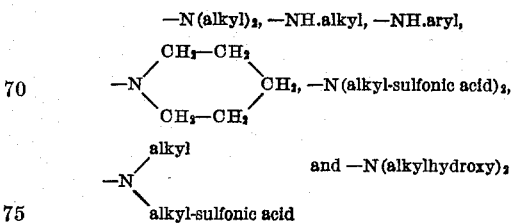

$X_2$ represents a radical of the group consisting of

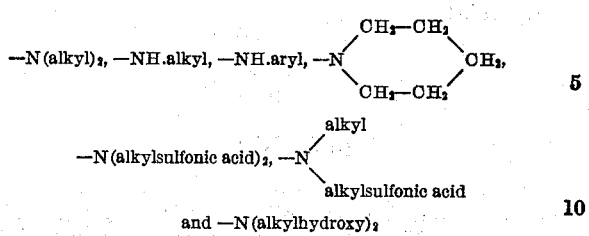

$X_3$ represents a radical of the group consisting of hydrogen and alkyl.

3. The compound of the formula:

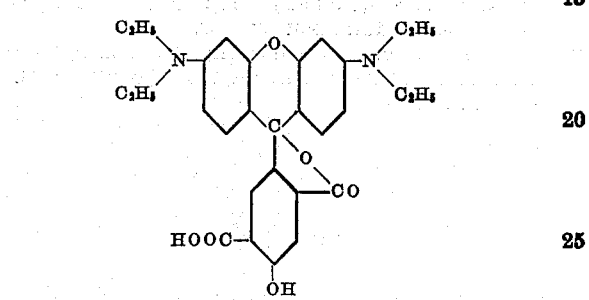

being a dyestuff which dyes, for instance, wool from an acid bath very vivid red tints, the fastness properties of the dyeings, particularly the fastness to washing and fulling, being essentially enhanced by after-chroming and which may be used with a good success in printing with chromium on cotton and may be transformed according to known methods in substance into the corresponding chromium-compounds.

4. The compound of the formula:

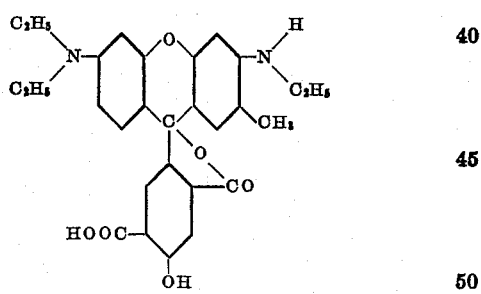

being a dyestuff which dyes wool from an acid bath bright pink-red tints, the chromed dyeings of which show in general very good fastness properties, particularly very good fastness to light.

5. The compound of the formula:

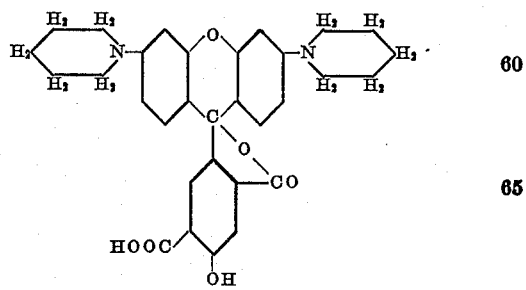

being a dyestuff which dyes wool from an acid bath bright bluish red tints which darken a little on after-chroming, but show thereafter very good fastness properties.

6. The process which comprises causing one mol. of a hydroxy-trimellitic anhydride of the formula:

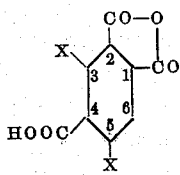

wherein one X represents the hydroxy group and the other X hydrogen, to react with two mols. of an N-substituted meta-amino-phenol compound containing a reactive hydrogen atom in para-position to the substituted amino group, by melting the reagents at a temperature of between about 150° C. and about 250° C.

7. The process which comprises causing one mol. of a hydroxy-trimellitic anhydride of the formula:

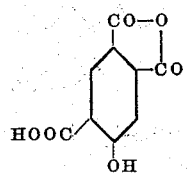

to react with two mols. of an N-substituted meta-amino-phenol-compound containing a reactive hydrogen atom in para-position to the substituted amino group, by melting the reagents at a temperature of between about 150° C. and about 250° C.

8. The process which comprises causing one mol of 5-hydroxy-trimellitic anhydride of the formula:

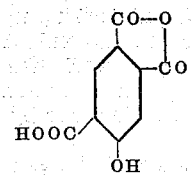

to react with two mols. of diethylamino-m-phenol by melting a mixture of the reagents at about 180° C. until the melt has solidified.

9. The process which comprises causing one mol of 5-hydroxy-trimellitic anhydride of the formula:

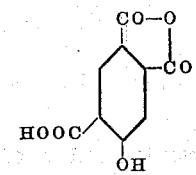

to react with two mols. of m-piperidyl-phenol by melting a mixture of the reagents at about 170° C. to about 180° C. for about 3 hours.

WILHELM ECKERT.
KARL SCHILLING.